United States Patent [19]

Longpre

[11] 3,779,330

[45] Dec. 18, 1973

[54] BELLY PROTECTIVE PAN FOR TRACTOR ENGINE

[76] Inventor: Mose Walter Longpre, P.O. Box 224, Alberton, Mont. 59820

[22] Filed: Apr. 20, 1972

[21] Appl. No.: 245,952

[52] U.S. Cl............... 180/69.1, 184/106, 280/504, 292/48
[51] Int. Cl........................................... B62d 25/20
[58] Field of Search..................... 180/69.1, 54 D; 184/106; 296/38; 62/291; 220/1 C; 312/216, 218, 219, 233; 292/48, 7; 280/80 B, 407; 200/504

[56] References Cited
UNITED STATES PATENTS

| 917,926 | 4/1909 | Coffin | 180/69.1 |
| 2,379,157 | 6/1945 | Jones | 312/333 X |
| 2,860,891 | 11/1958 | Ramum | 280/80 B X |
| 3,670,835 | 6/1972 | Ross et al. | 180/69.1 |
| 1,182,378 | 5/1916 | Jewell | 180/69.1 |
| 2,912,270 | 11/1959 | Hawkins | 292/48 X |

FOREIGN PATENTS OR APPLICATIONS

| 571,826 | 2/1933 | Germany | 292/48 |
| 479,910 | 2/1938 | Great Britain | 292/48 |

Primary Examiner—Kenneth H. Betts
Assistant Examiner—David M. Mitchell
Attorney—Greek Wells et al.

[57] ABSTRACT

A protective shield or pan is removably mounted beneath the undercarriage of a tractor engine, enveloping the exposed surfaces of the oil pan beneath the tractor engine. It is guided along a longitudinal track assembly mounted to the tractor undercarriage. It is releasably secured by interlocking engagement of pivoted stops mounted along the interior sides of the belly pan and cooperative receiving slots formed through the supporting track assembly. The stops are externally operated by pivotal movement of a pulling hook at the outer end of the pan.

5 Claims, 7 Drawing Figures

PATENTED DEC 18 1973          3,779,330

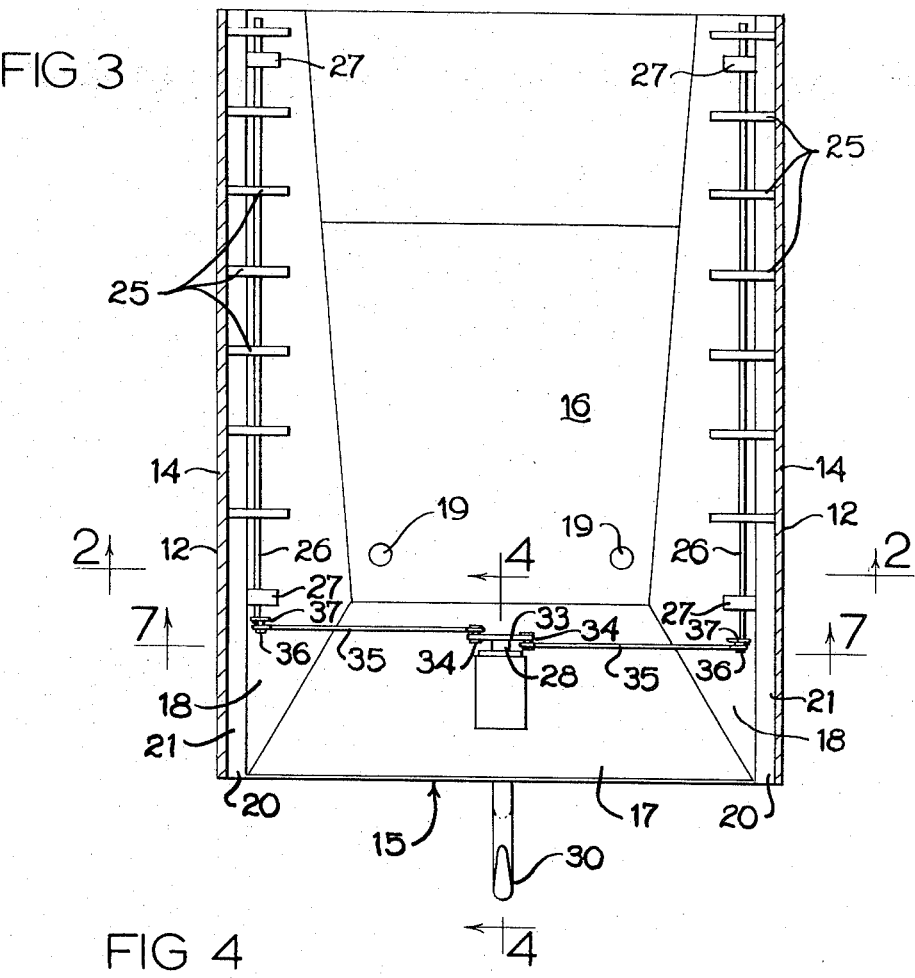
FIG 3
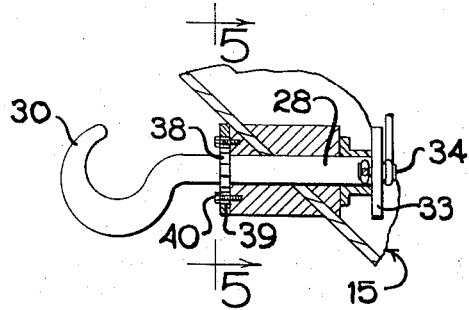
FIG 4
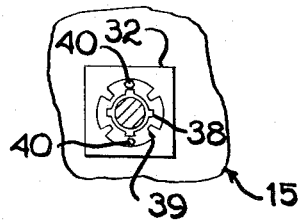
FIG 5
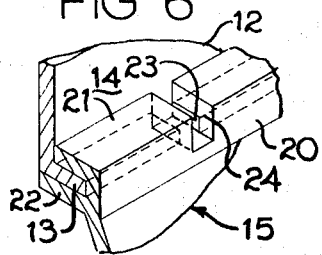
FIG 6
FIG 7

BELLY PROTECTIVE PAN FOR TRACTOR ENGINE

BACKGROUND OF THE INVENTION

Track-mounted tractors of the heavy duty type used in the construction industry require external protection about the engine oil pan, which typically depends downwardly from the undercarriage of the tractor adjacent to its forward end. The engine pan is vulnerable to damage or rupture during normal use of the tractor. Prior protective devices, commonly known as "belly pans" have typically been bolted to the undercarriage of the tractor frame. The removal of such an assembly for access to the oil pan or lower portions of the engines is a particularly difficult job. The bolts sometimes become bent or damaged and auxiliary support is needed to carry the rather heavy weight of the belly pan. This weight factor is substantial, since heavy steel plate must be used in the fabrication of such a belly pan to provide the protective armor desired. Lowering of such a bulky heavy assembly in the narrow space below a tractor and subsequent replacement is difficult.

The present invention is concerned with the mounting of the belly pan along slidable tracks at the undercarriage of the tractor. The releasable devices that selectively lock the removable pan to the tracks are all located within the interior confines of the pan and therefore not subjected to external forces. In the preferred form of the invention, the usual pulling hook mounted at the exterior front end of the belly pan serves a dual purpose as an external handle to control the interlocking devices that latch the belly pan to the underside of the carriage.

OBJECTS OF THE INVENTION

A first object of this invention is to provide a practical protective shield or belly pan to envelope the exposed portions of a tractor engine oil pan, with all vulnerable supporting and latching devices being protected from external damage and located within the interior confines of the assembled structure.

Another object of the invention is to provide a one piece belly pan that can be readily assembled or removed from a tractor for repair or replacement purposes.

Another object of the invention is to provide a releasably latched belly pan which utilizes a front pulling hook as the external handle for control of the latching devices.

These and further objects will be evident from the following disclosure, taken together with the accompanying drawings, which illustrate a preferred form of the invention.

DESCRIPTION OF THE DRAWINGS

FIG. 3 is a plan sectional view taken along line 3—3 in FIG. 2;

FIG. 4 is an enlarged fragmentary sectional view of the pulling hook as seen along line 4—4 in FIG. 3;

FIG. 5 is a fragmentary front sectional view of the pulling hook assembly as seen along line 5—5 in FIG. 4;

FIG. 6 is an enlarged fragmentary perspective view of the interior track assembly; and FIG. 7 is a fragmentary sectional view taken along line 7—7 in FIG. 3, showing operation of the latching mechanism.

DESCRIPTION OF THE PREFERRED EMBODIMENT

Figure 1:
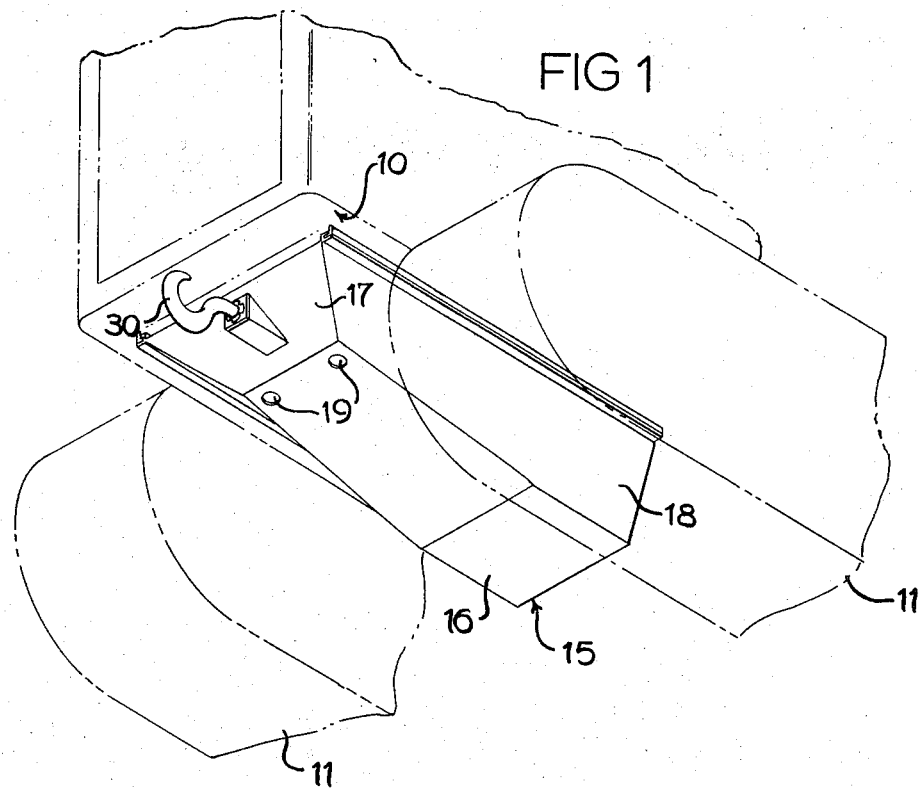
FIG. 1 is a bottom perspective view looking upward toward the front of the assembled belly pan, the outline of a typical tractor being shown in phantom lines.
Figure 2:
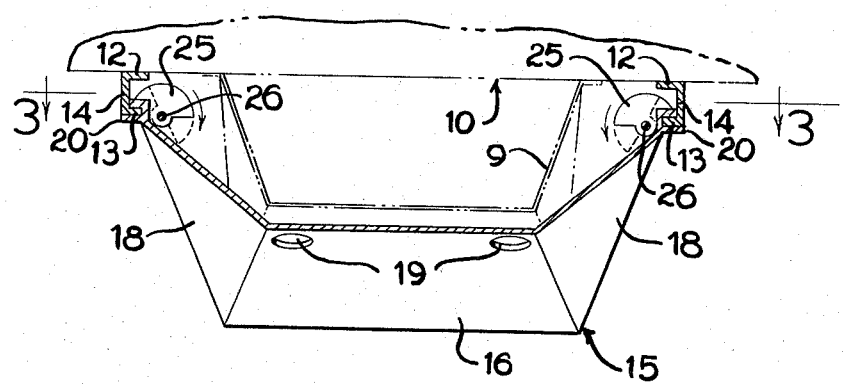
FIG. 2 is a front elevational sectional view taken along line 2—2 in FIG. 3.

FIG. 1 schematically illustrates a phantom view of a tractor having longitudinal track assemblies 11 at each side of a central framework, including an undercarriage shown generally at 10. Protruding slightly beneath the undercarriage 10 at the front of the tractor is a conventional engine oil pan 9 (FIG. 2). This disclosure is concerned with an auxiliary shield or "belly pan" for enveloping and protecting the vulnerable and exposed surfaces of oil pan 9.

The "belly pan" is indicated generally at 15. It is formed as a unitary assembly movable as one piece between the mounted position shown in FIG. 1 and a partially or fully removed position for servicing of the engine. The belly pan 15 covers the sides, bottom and front of the oil pan 9. The rear exposed surfaces of the oil pan 9 are typically located forwardly adjacent to transverse frame elements on such tractors (not shown). Belly pan 15 is open at its rear end, being designed to abut these conventional transverse frame members, which therefor cooperate with belly pan 15 to fully envelope the exposed oil pan structure.

Belly pan 15 is mounted to the undercarriage 10 by cooperative sliding track elements. These include transversely spaced longitudinal channel track elements 12 welded or otherwise fixed along the lower surfaces of undercarriage 10. Each track element 12 includes an inwardly facing lower horizontal flange 13 and a vertical or upright supporting web 14. Both the flange 13 and web 14 are continuous and extend throughout the length of the belly pan assembly.

The belly pan 15 includes a floor plate 16, which may be provided with drainage apertures 19 suitably located to allow moisture or water to escape from the interior of the structure. The forward sections of the floor plate 16 may be upwardly and forwardly inclined to facilitate riding engagement of ground obstructions encountered by the belly pan 15. The structure also includes an inclined front wall 17 and inclined side walls 18. The relative sizes of the plate 16 and walls 17, 18 are such as to permit them to be fitted over the engine oil pan 15 with reasonable clearance at all sides of the oil pan structure. Therefore, slight dents that might occur in the belly pan 15 will not be directly transmitted to the protected oil pan 9.

The upper edges of each side wall 18 terminate along longitudinal slide elements 20 which have a transverse C-shaped configuration (FIG. 2). The slide elements 20 each include upper and lower horizontal flanges 21, 22 spaced so as to slidably engage the upper and lower surfaces of the previously described flanges 13 (FIG. 6). Sliding engagement of the slide elements 20 between the channel track elements 12 serves to prevent both transverse and elevational movement of the belly pan 15 relative to the tractor undercarriage 12.

Longitudinal positioning of belly pan 15 is accomplished by a releasable locking mechanism extending along each side of the pan 15 and best understood from a study of FIGS. 3–7. The pan 15 is selectively locked in place on the tractor by interengagement of movable abutments in the form of pivoted stops 25, which selectively fit within aligned slots 23, 24 formed through flanges 13 and 21 respectively.

The stops 25, which are illustrated in the form of semi-circular plates, are fixed to longitudinal pivot shafts 26 which in turn are pivotally mounted along the inner surfaces of side walls 18 by suitable bearings 27. The stops 25 are all similarly indexed about the axes of shafts 26 and move as a unit between the operative locked position shown in full lines in FIGS. 2 and 7, and the inoperative or unlocked position shown in dashed lines in FIGS. 2 and 7. A multiple number of stops 25 are provided along each side of pan 15 to securely interlock the track assembly along the entire length of the apparatus.

The slots 23, 24 are spaced identically to the spacing of the stops 25 along the shaft 26. Because of the multiple stops and multiple slots, it is necessary that the belly pan 15 be in its proper mounted position before stops 25 can be received in the slots 23, 24. If the belly pan 15 is not properly positioned, stops 25 cannot fully pivot to the operative locked position, since one or more of them will engage the solid portions of flanges 13. This prevents accidental locking of belly pan 15 to the undercarriage 10 without being first properly located for protection of the oil pan 9.

The pivot shafts 26 are pivoted in unison from a central control shaft 28, which is integral with a forwardly directed pulling hook 30 used in connection with the tractor for load engaging purposes. The pulling hook 30 and shaft 28 are supported by inner and outer leveling bearing blocks 31, 32 mounted respectively to the inner and outer surfaces of front wall 17 (FIG. 4). They maintain the axis of shaft 28 in a horizontal longitudinal orientation parallel to the axes of shafts 26.

The inner end of shaft 28 has fixed to it a disc 33 with protruding studs 34 which pivotally connect to a pair of transverse connecting links 35 extending to opposite sides of pan 15. The outer end of each link 35 is pivotally connected at 36 to short crank arms 37 fixed respectively to the front ends of the pivot shafts 26. As can be seen in FIG. 7, pivotal movement of shaft 28 results in opposed pivotal movement of the shafts 26 to move the respective stops 25 in unison between their operative and inoperative positions.

During use of the tractor, it is imperative that the pulling hook 30 be stationary on the belly pan. To selectively lock hook 30 and shaft 28 against rotation about the shaft axis, interfitting washers 38, 39 are fastened to the shaft 28 and outer bearing block 32 respectively. Washer 38 is welded or otherwise secured to the forward protruding part of shaft 28 at a position adjacent to the bearing block 32. It is normally surrounded by the washer 39, releasably fixed to the outer surface of bearing block 32 by removable bolts 40. Washer 39 has a center aperture that is toothed and is complementary to the exterior configuration of washer 38, whreby washer 38 and shaft 28 are prevented from rotating about the axis of shaft 28 when the lock washer 39 is secured to the assembly by bolts 40.

It is believed that the use of the belly pan is basically evident from the above description. To remove the belly pan from the position shown in FIGS. 1 and 2, one must release the two bolts 40 and pull washer 39 axially forward, leaving it loosely on the forward portion of shaft 28. Hook 30 can then be manually pivoted about the axis of shaft 28 to cause the connecting links 35 to pivot the shafts 26 at each side of the pan assembly. This pivotal movement due to inward motion of links 35 will cause the shafts 26 to pivot opposite to one another and thereby release the cooperative track assemblies as the stops 25 are removed from slots 23, 24. The belly pan 15 can be partially or fully moved forward. Partial movement might permit access to the oil pan 9 for drainage of oil from the engine. Complete removal might be desirable for engine repair or access. When the belly pan is in use, it must be properly placed in abutment with the transverse frame member immediately behind the oil pan 9. Proper placement is assured by the necessary alignment of slots 23, 24. The belly pan 15 is locked in place by reverse pivotal movement of hook 30 to cause the stops 25 to again interfit within slots 23, 24. The belly pan 15 and hook 30 are then securely locked in place by again securing washer 39 to bearing block 32 by means of bolts 40.

The structure shown in the drawings is relatively simple and inexpensive to produce. All of the movable parts are located within the protective confines of the belly pan 15 and are not subject to external damage. The only external bolts are bolts 40, which are located at a relatively protected position elevated along the front wall 17, and which are themselves protected by the protruding adjacent structure of pulling hook 30. The belly pan 15 is easily removed without special tools, and since it is pulled forwardly along the slide assemblies, can be more readily assembled from an accessible location in front of the tractor, as opposed to the more difficult task of supporting a released belly pan beneath the tractor undercarriage.

Minor changes might be made with respect to some of the mechanical details illustrated and described in this specification. Therefore, only the following claims are intended to define the scope of the invention described herein.

Having thus described my invention, I claim:

1. A belly pan assembly for protecting the oil pan of a tractor engine, comprising:
   a pair of transversely spaced longitudinal track elements fixed to the undercarriage of a tractor alongside opposite sides of the engine oil pan;
   an upwardly-open protective belly pan having complementary slide elements fixed thereto, said belly pan being mounted to the tractor undercarriage by sliding engagement with said track elements to enable the pan to be moved longitudinally forward beneath the tractor undercarriage to provide access to the engine oil pan;
   a pulling hook mounted to a front end of the belly pan;
   said hook having an integral shaft rotatably mounted to the belly pan about its shaft axis between a locking angular position in which the hook extends in an upward vertical orientation and an angularly spaced unlocking angular position in which the hook is angularly displaced from the upward vertical orientation; and
   a releasable locking means operatively connected to said shaft and responsive to the angular position of the shaft about its axis for preventing sliding movement of the belly pan from beneath the engine oil pan when the shaft is in its unlocking angular position.

2. The apparatus set out in claim 7 wherein the releasable locking means comprises a movable abutment mounted to the belly pan and engageable with said track elements to thereby selectively fix the belly pan relative to the track elements.

3. The apparatus set out in claim 7 wherein the track elements and slide elements have complementary slots formed therein that are aligned in registry with each other when the belly pan is supported beneath the engine oil pan by said track elements at a selected longitudinal location along the tractor undercarriage;

said locking means including interconnected stops movable in unison into the slots when so aligned to thereby prevent relative movement between the track elements and the belly pan.

4. The apparatus set out in claim 7 wherein the track elements and slide elements have complementary slots formed therein that are aligned in registry with each other when the belly pan is supported beneath the engine oil pan by said track elements at a selected longitudinal location along the tractor undercarriage;

said locking means including a plurality of pivoted stops respectively aligned with the slots on said slide elements, said stops being movable about longitudinal axes at the sides of the belly pan in unison into the aligned slots of the track elements and slide elements to thereby prevent relative movement between the track elements and belly pan.

5. The apparatus set out in claim 10 wherein said locking means includes linkage means operatively connected between the shaft and said stops for moving the stops into the aligned slots of the track elements and slide elements when said shaft is turned to its locking angular position and for moving the stops from within the slots when said shaft is turned to its unlocking angular position.

* * * * *